E. T. SILVIUS.
TRANSMISSION AND CONTROLLING GEARING.
APPLICATION FILED FEB. 14, 1916.
1,322,965.
Patented Nov. 25, 1919.
6 SHEETS—SHEET 1.
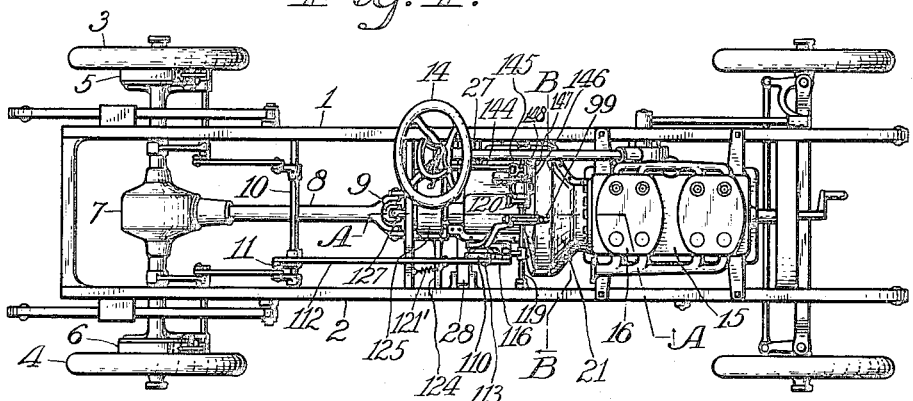
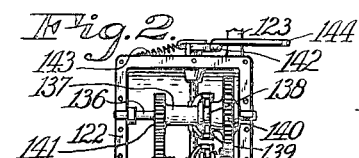
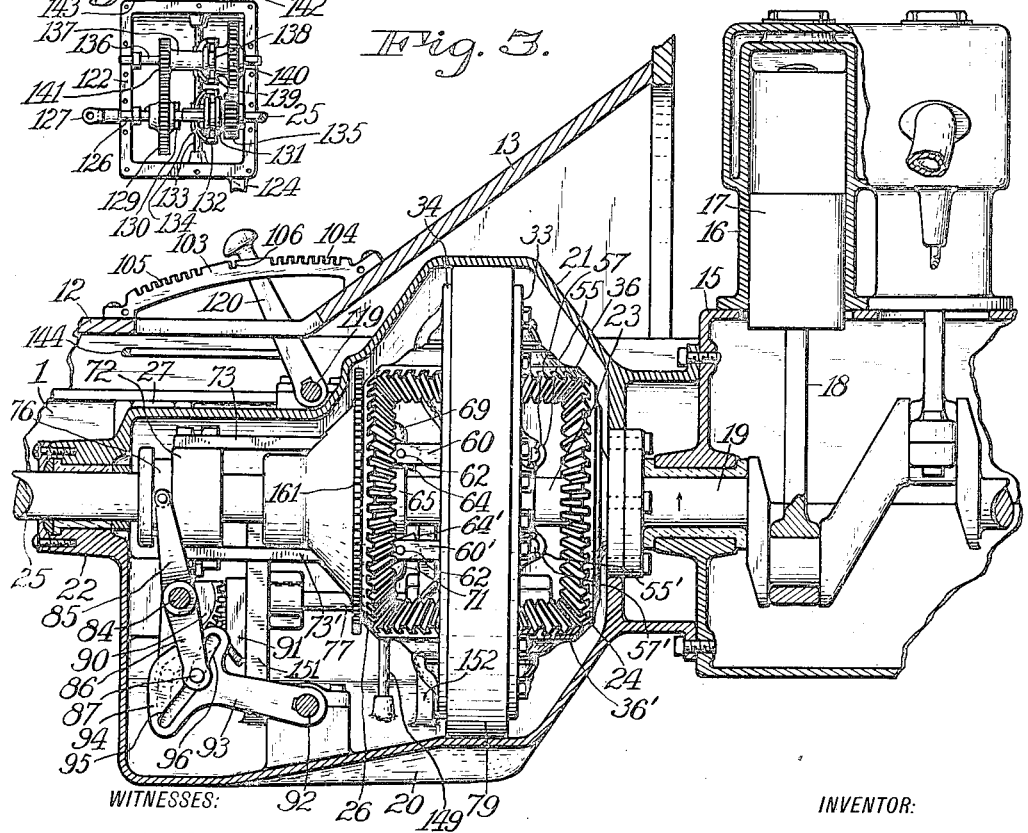
WITNESSES:
J. H. Gardner
W. E. Sparrow
INVENTOR:
Ellis T. Silvius E. T. SILVIUS.
TRANSMISSION AND CONTROLLING GEARING.
APPLICATION FILED FEB. 14, 1916.
1,322,965.
Patented Nov. 25, 1919.
6 SHEETS—SHEET 2.
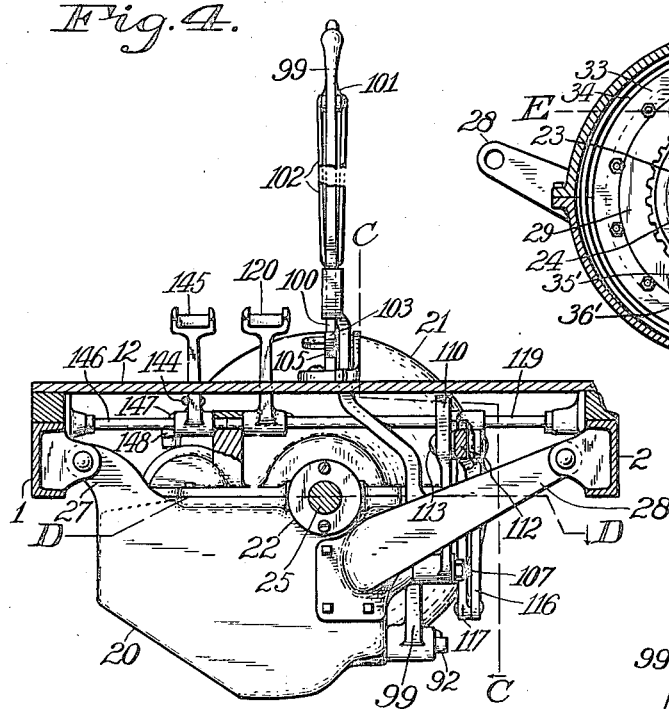
WITNESSES:
J. H. Gardner
M. E. Sparrow
INVENTOR:
Ellis T. Silvius.

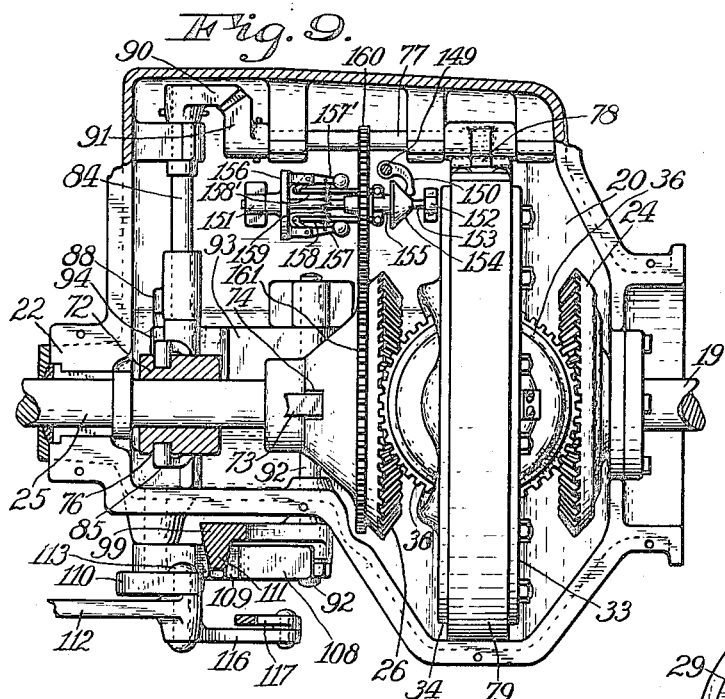
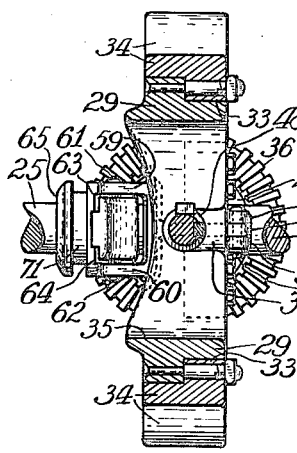
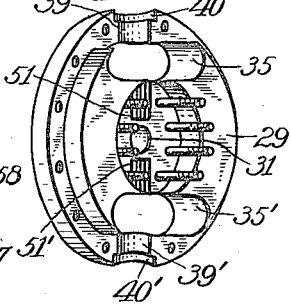
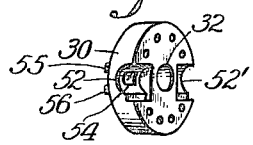
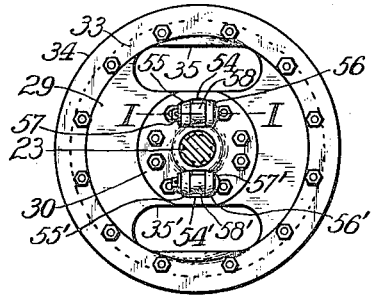

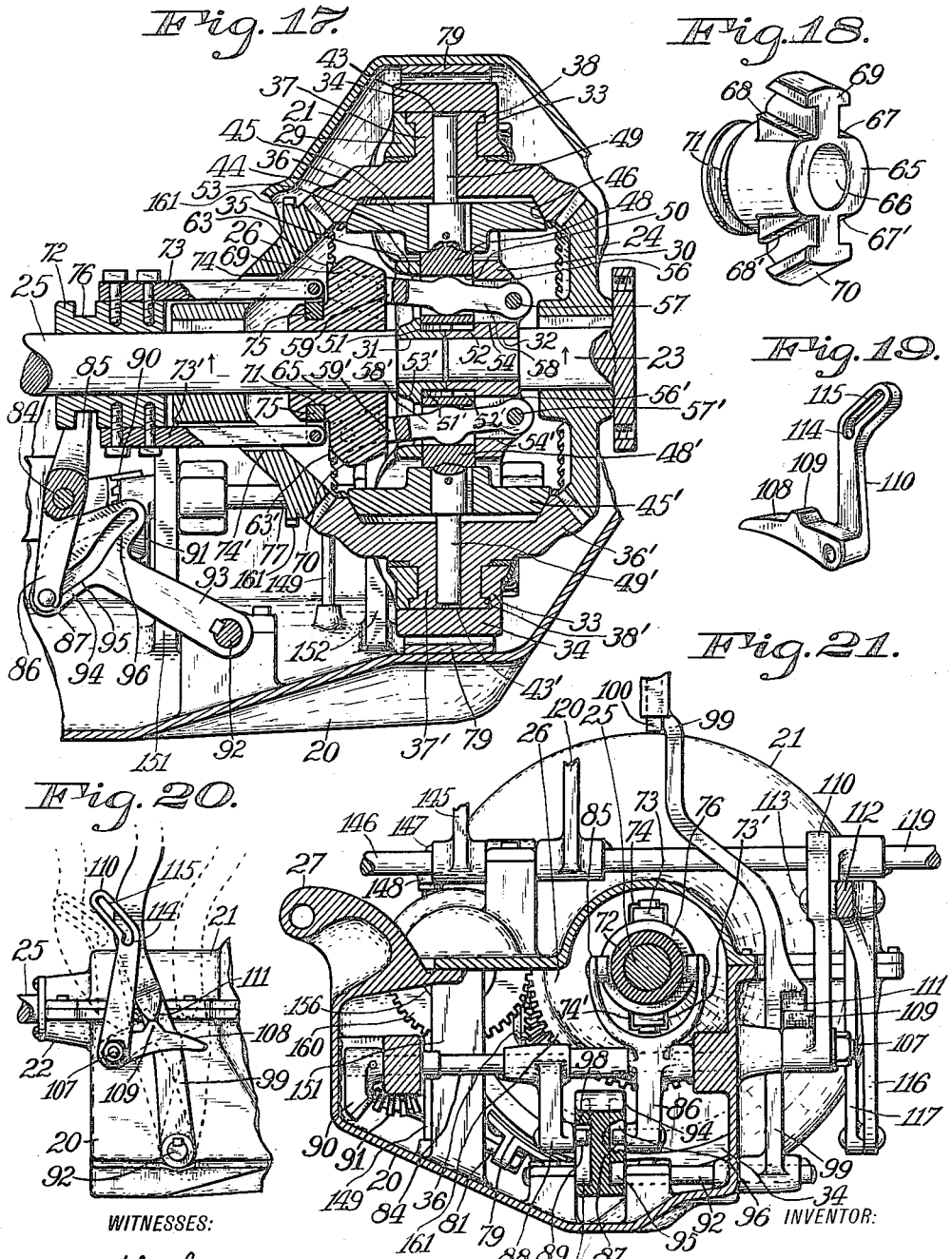

E. T. SILVIUS.
TRANSMISSION AND CONTROLLING GEARING.
APPLICATION FILED FEB. 14, 1916.

1,322,965.

Patented Nov. 25, 1919.
6 SHEETS—SHEET 5.

WITNESSES:
J. H. Gardner.
M. E. Sparrow.

INVENTOR:
Ellis T. Silvius.

E. T. SILVIUS.
TRANSMISSION AND CONTROLLING GEARING.
APPLICATION FILED FEB. 14, 1916.
1,322,965.
Patented Nov. 25, 1919.
6 SHEETS—SHEET 6.
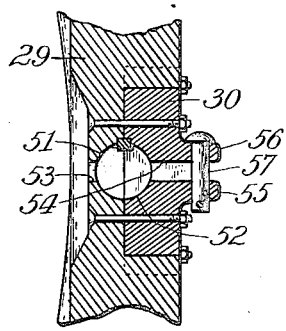
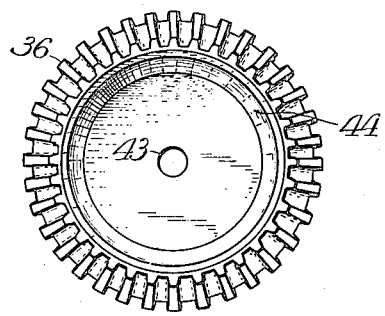
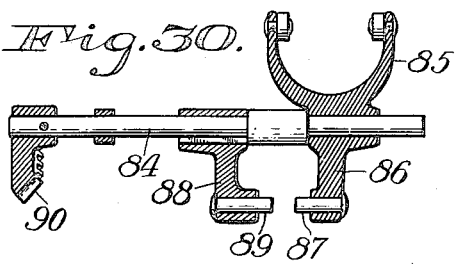
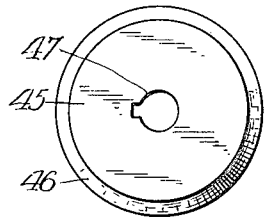
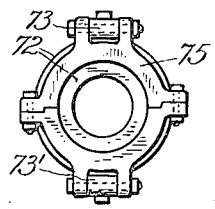
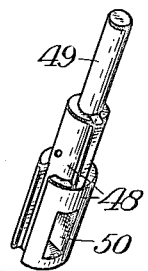
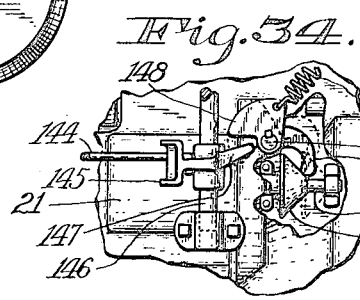
WITNESSES:
J. H. Gardner.
M. E. Sparrow.
INVENTOR:
Ellis T. Silvius.

UNITED STATES PATENT OFFICE.

ELLIS T. SILVIUS, OF INDIANAPOLIS, INDIANA.

TRANSMISSION AND CONTROLLING GEARING.

1,322,965.  Specification of Letters Patent.  Patented Nov. 25, 1919.

Application filed February 14, 1916. Serial No. 78,251.

*To all whom it may concern:*

Be it known that I, ELLIS T. SILVIUS, a citizen of the United States, residing at Indianapolis, in the county of Marion and State of Indiana, have invented a new and useful Transmission and Controlling Gearing, of which the following is a specification, reference being had to the accompanying drawings and to the letters and figures of reference marked thereon.

The invention relates generally to the transmission of rotary power motion and reversing the direction of motion of the element to which the power may be transmitted from a driving element, while the driving element rotates in one direction, the invention having reference more particularly to a type of transmission gearing that is designed for gradually varying the speed of the motion transmitted, in both forward and reverse directions, and connecting the driven element with or disconnecting it from the driving element; the invention having reference also to gearing and means for controlling the transmission gearing, and also means for controlling a brake for the driven element.

An object of the invention is to provide reliable variable-speed gearing and controlling gearing therefor of the gradual-change type, but having constant-connection toothed wheels, that shall be so constructed and arranged as to reversibly transmit power motion from a non-reversible driver, more especially from an internal-combustion or explosion type of driving engine to a shaft, and be capable of being simply operated and controlled by an operator in order to lessen liability of miscontrol and accident.

Another object is to provide improved and efficient graduating speed-changing transmission gearing of the positive or constant-connection toothed type, in order to obviate the various well-known disadvantages and repair expense entailed by the use of the sliding gear type of speed-changing gearing and necessary separate connection-clutch; and, to eliminate the trouble and danger due to accidental slippage of the shiftable friction-drive speed-changing transmission gearing used to some extent in automobile construction, which improved gearing shall be applicable or adaptable to various classes of motor-driven cars, boats and air-craft, and be durable and economical in use.

Another object is to provide reliable speed-changing transmission gearing of such construction as to be capable of noiselessly changing the speed without shocks when in motion, and to provide simply-operated controlling gearing and apparatus therefor of such construction as to quietly and smoothly control the transmission gearing in a simple and reliable manner, and without causing jerks that are damaging to penumatic tires of vehicles, with the minimum number of manually-operated levers or pedals in order to reduce the liability of the operator to make mistakes, especially in emergencies, in directing or controlling the operation of the propelling mechanism of a motor-driven vehicle or vessel.

A further object is to provide improved compound transmission gearing for motor-driven vehicles, such as pleasure cars and trucks, which shall be so constructed as to be capable of transmitting motion from a high-speed engine either at engine speed or any slower speed desired, and capable also of changing the motion to a definite and very slow speed and greatly increasing the transmitted power relatively to that developed for the vehicle at engine speed, and gradually increasing the transmitted speed, to enable the car or truck to start with high power from mire or mud while the engine runs at high speed, to climb a steep hill, or to carry or draw an unusually heavy load, and permitting gradually-increasing vehicle speed.

A still further and no less important object is to provide improved means including a prime controller whereby an operator, by simple and easy manipulation of the controller, may operatively connect the propeller shaft of an automobile or other motor-driven vehicle with the engine thereof when in motion, variably change the speed of the shaft without jar or noise, reverse the motion, or disconnect the shaft from operative connection with the engine and to also automatically apply a brake if desired to slow down or stop the vehicle, to the end that the operator, although little-experienced or physically weak, shall be enabled to promptly, positively and safely control the propelling and momentum movements of the vehicle without confusion under all conditions, and especially in emergencies requiring quick action to avoid accident.

With the above-mentioned objects and other objects which will hereinafter become apparent in view, the invention consists in a main or general-service gradually-modifying and reversible speed-changing transmission gearing or mechanism of novel construction and having the qualification of a connecting device between the driving and the driven elements of a train of gearing, more especially in connection with an internal-combustion engine; the invention preferably including also a relatively high power special-service gearing, which is governed, as to permitted periods of operation, by the general-service gearing and operates to transmit relatively low speeds, as an auxiliary thereto and in connection therewith when required to augment the power of the general-service gearing. And further the invention consists in a novel prime controller and appurtenances thereof for the general-service gearing and designed to be manually operated so as to effect the starting and the changing of speed of the driven element, the controller preferably being provided with novel means enabling it to automatically apply or release a brake device when the driven element is practically disconnected from the driving element. The invention consists also further in a novel compound gearing, and also in the novel parts and combinations and arrangements of parts, as hereinafter particularly described and further defined in the appended claims.

Referring to the drawings for a full understanding of the details of the invention—

Figure 1 is a fragmentary top plan of an automobile with which the invention is illustrated.

Fig. 2 is a top plan of auxiliary high-power gearing which preferably is included as a portion of the compound gearing system contemplated in the invention.

Fig. 3 is a sectional elevation approximately on the line A A on Fig. 1, omitting the auxiliary gearing.

Fig. 4 is a rear elevation of the housing or gear case and parts of the main gearing.

Fig. 5 is a transverse section of the gearing approximately on the line B B on Fig. 1.

Fig. 6 is a perspective view showing one side of a novel shifting-link pertaining to the prime controller provided for rapidly and smoothly reversing the direction of motion of the driven element of the transmission gearing.

Fig. 7 is a perspective view showing the reverse side of the improved shifting-link.

Fig. 8 is a fragmentary section approximately on the line C C on Fig. 4 showing the housing and parts of the improved gearing in elevation.

Fig. 9 is a sectional plan approximately on the line D D on Fig. 4.

Fig. 10 is a perspective view of a novel part of the improved gearing.

Fig. 11 is a fragmentary section showing details of one of the parts of the gearing as preferably constructed.

Fig. 12 is a plan of one side of an improved rotatable gear frame comprising a part of the gearing as illustrated.

Fig. 13 is a section of the gear frame and gearing therein approximately on the line E E on Fig. 5.

Fig. 14 is a perspective view of the main part of the gear frame as preferably constructed.

Fig. 15 is a plan view of the gear frame showing the side opposite to that seen in Fig. 12.

Fig. 16 is a perspective view of a detachable part of the gear frame.

Fig. 17 is a fragmentary section approximately on the line A A on Fig. 1, showing the principal parts of the main transmission gearing as preferably constructed and in assembled arrangement.

Fig. 18 is a perspective view of one of the movable elements of the preferred form of the main gearing.

Fig. 19 is a perspective view of a novel device for enabling the operator to automatically apply a brake to the driven element following the disconnection of the driven element from the driving element.

Fig. 20 is a fragmentary side elevation of the housing or main gear case and controlling devices thereon.

Fig. 21 is a sectional elevation approximately on the line F F on Fig. 8.

Fig. 28 is a fragmentary section on the plane of the line I I on Fig. 15.

Figure 22:
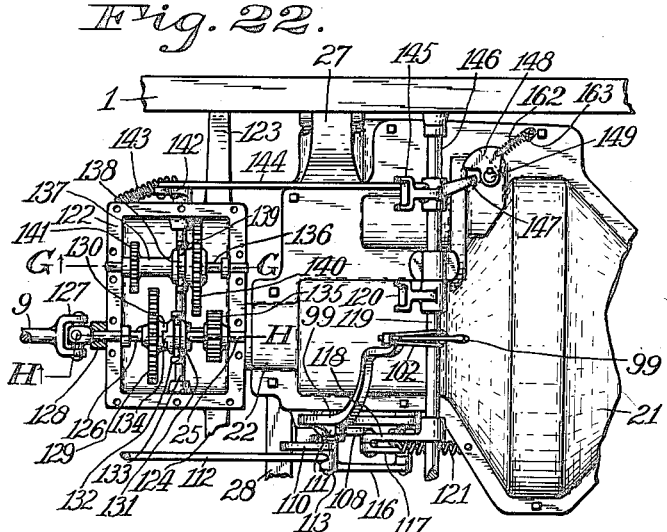
Fig. 22 is a fragmentary top plan of the gearing in which parts of the auxiliary gearing are adjusted differently than as seen in Fig. 2.
Figure 23:
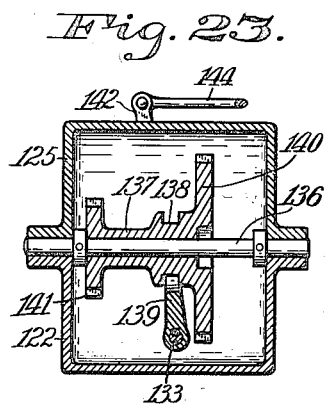
Fig. 23 is a section of the auxiliary gearing on the line G G on Fig. 22.
Figure 24:
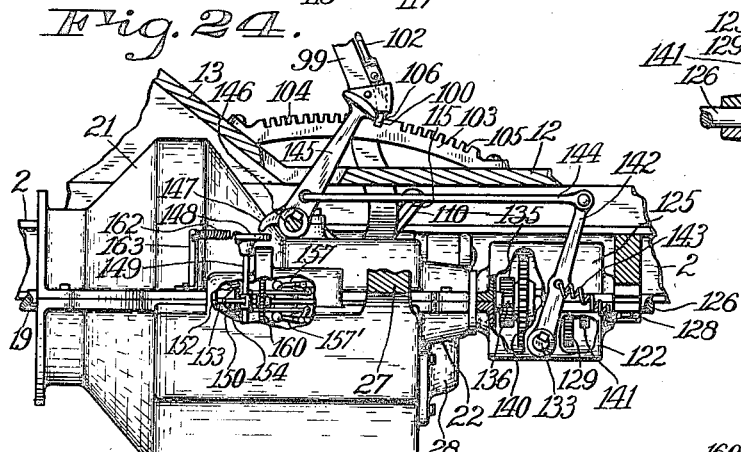
Fig. 24 is a side elevation of the improved gearing in which portions of the housing are broken away to disclose portions of the gearing therein.
Figure 25:
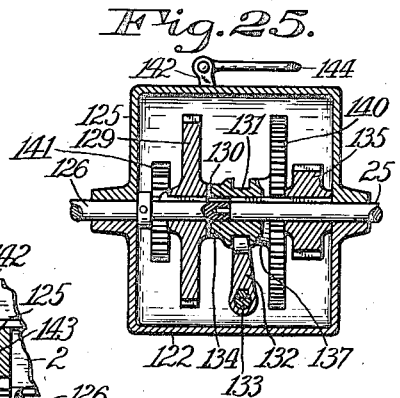
Fig. 25 is a section on the line H H on Fig. 22.
Figure 26:
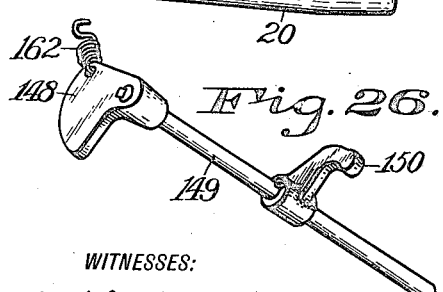
Fig. 26 is a perspective view of one of the devices for controlling the times at which the auxiliary gearing illustrated may be connected with the main gearing or disconnected therefrom.
Figure 27:
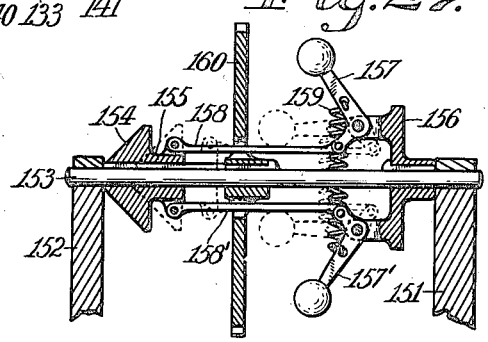
Fig. 27 is a central section of a suitable governor for the herein described auxiliary gearing.

Fig. 29 is a plan view of a novel controller pinion or toothed gear wheel of the main gearing whereby a toothed driven wheel is constantly connected with a toothed driving wheel of the main gearing, the pinion or wheel being adapted to be rotated in the gear frame at various speeds whereby to vary the speed of the motion transmitted, or to be clutched and practically locked to the gear frame to constitute a lug whereby the driven wheel may be rotated at the speed of the driving wheel.

Fig. 30 is a sectional elevation of parts of the gearing that are directly connected with the novel shifting-link.

Fig. 31 is a plan of a suitable adjustable part or disk of the gear frame to coöperate with the novel pinion or gear wheel for the purpose of gradually reducing the rotary speed or stopping rotation of the pinion or gear wheel.

Fig. 32 is an end elevation of a number of connected elements comprised in the apparatus for adjusting and controlling the adjustable part or disk.

Fig. 33 is a perspective view of a movable part of the gear frame connected with the adjustable part or disk, and Fig. 34 is a fragmentary top plan showing portions of the safety governor and apparatus for controlling the auxiliary gearing.

Similar reference characters on the drawings throughout the different figures thereof indicate corresponding parts or features of construction herein referred to in detail.

The invention being of such a nature as to be adapted to be practically applied to advantage in automobile construction is, for the purpose of conveniently explaining the principles involved in the invention, shown as applied to an automobile of familiar type which comprises side rails 1 and 2 and various other parts of a main frame mounted on wheels, the rear wheels 3 and 4 being provided with brakes 5 and 6 respectively, and the rear axle being provided, as is well known, with a differential gearing inclosed in a gear case 7 to which is connected a propeller shaft casing 8 through which a propeller shaft 9 extends to the differential gearing. Suitable brake rigging is provided for the brakes and commonly includes a brake-shaft 10 having an operating arm 11 fixed thereon. Commonly the body of the automobile has a floor 12 which has an inclined portion 13 that conveniently serves as a foot-rest for the operator as he sits within reach of the usual steering-wheel 14. For supplying the required power an explosion engine is illustrated which comprises an engine frame or crank-case 15 mounted on the automobile frame and supporting explosion cylinders 16 in which are pistons 17 provided each with a pitman 18 connected to a crank-shaft or driving-shaft 19 rotatably mounted in the frame or crank-case 15. The various parts and features of the automobile being well-known, or may be variously constructed as to details, the foregoing reference thereto is deemed sufficient to an understanding of the invention as applied to such vehicle.

In practically carrying out the objects of the invention a suitable housing or gear case is provided which comprises a lower or main part 20 and a top or cap 21 removably bolted to the part 20, one end of the housing preferably being secured to and supported by the engine frame or crank-case 15, the opposite end being provided with a journal box 22 adapted to support a shaft in alinement with the crank-shaft 19. The housing is so constructed as to be capable of retaining lubricating oil for the gearing and movable appliances that are mounted in the housing. An extension shaft 23 is provided which is secured to the crank-shaft 19 as an extension thereof, and for the purposes of the invention constitutes a driving-shaft to which a toothed wheel, preferably a bevel toothed gear wheel 24 is fixedly secured to constitute the driving-wheel of the gearing, the shaft 23 and the wheel 24 being in the housing. Another shaft 25, which constitutes the driven or propeller shaft is rotatably mounted in the journal box 22 and extends substantially to the shaft 23 in alinement therewith. The shaft 25 may be variously connected with the driving-wheels of the automobile, or with other means for utilizing the power imparted to the shaft, the shaft 25 being in the present case illustrated as a section of the so-called propeller shaft of the automobile. A toothed wheel, preferably a bevel toothed gear wheel 26 is fixedly secured to the shaft 25 within the housing, and in the present case is of the dished type and arranged with its concave face presented toward the driving-wheel 24. The rear portion of the housing, preferably the lower part 20 thereof, in the present case is provided with supporting arms 27 and 28 that are connected respectively to the side rails 1 and 2 for support.

A novel rotatable gear frame is provided and arranged within the housing, and as a convenient and economical construction preferably comprises a main part 29 and a hub part 30 fixedly secured together. The frame is suitably guided to rotate between the wheels 24 and 26, being preferably guided on the adjacent end portions of the shafts 23 and 25, the part 29 having a bore 31 to receive a portion of one shaft, the part 30 having a bore 32 to receive a portion of the adjacent shaft. The frame preferably has a separate removable annular rim comprising a side portion 33 and a peripheral portion 34, the latter having a smooth outer face adapted to be frictionally engaged, the rim part normally being fixedly secured to the main part 29. The gear frame is adapted to carry a number of series of devices, there being preferably a sufficient number of series to balance the weight on the axis of the frame, two series being illustrated, the two being identically alike; and to this end the gear frame has two apertures 35 and 35' therein in which two controllable pinions or perferably bevel toothed gear wheels 36 and 36' are respectively arranged, the backs or outer sides of the pinions or wheels being provided with journals 37 and 37' respectively, the ends of the journals having collars 38 and 38' respectively. The journals are rotatably supported in the frame to maintain the pinions or wheels in mesh with the wheels 24 and 26. The main part 29 of the frame has bearing portions 39 and 39' and recesses 40 and 40' to receive the journals and their collars respectively, the rim part having oppositely arranged corresponding bearing portions 41 and recesses 42 that receive the opposite portions of the journals and their collars respectively. The pinions or wheels have frictional bearing contact with the wall of the gear frame at the outer side of the apertures 35 and 35' respectively, and preferably the pinions or wheels have central axle bores 43 and 43' respectively. The inner side of each pinion or wheel 36 and 36' has an annular frictional contact face 44 of suitable contour which preferably is inclined so as to present an approximately concave face toward the axis of the gear frame. Controlling devices are provided for the pinions or wheels and preferably are formed as adjustably supported disks 45 and 45' respectively, having each a suitably shaped periphery 46 that is smooth and conforms to the contact-face of the pinion or gear wheel, the devices being arranged adjacent to the inner sides of the pinions to coöperate therewith. Suitable appliances are mounted in the gear frame for adjusting and controlling the disks, the disks having each a central guide-bore 47 therein, the appliances preferably comprising arbors 48 and 48' that extend through the bores of the disks and are fixedly secured to the disks respectively, the arbors having axle portions 49 and 49' that extend into the bores 43 and 43' of the pinions 36 and 36' respectively to assist in guiding the pinions. Each arbor has a transverse aperture 50 in its body portion, the body portions extending from the disks toward the axis of rotation of the gear frame, so that the axis of rotation of the pinions are at right angles to the axis of rotation of the gear frame. The body portions of the arbors are guided for longitudinal movement in sockets that are provided in the gear frame, in the present case by means of socket portions 51 and 51' in the main part 29 and corresponding socket portions 52 and 52' in the hub part 30, suitable provision being made for preventing rotation of the arbors which are adjustable to cause the disks to be forced against the pinions or wheels in order to gradually retard rotation of the pinions or to substantially lock or clamp them to the gear frame. The main part 29 of the gear frame has guideways 53 and 53' therein, and the hub part 30 has apertures 54 and 54' opposite to the guideways. The part 30 has also pivot ears 55 and 56 adjacent to the aperture 54 and similar ears 55' and 56' adjacent to the aperture 54', one pair of ears being provided with a pivot 57, the other pair with a similar pivot 57'. Suitable appliances for adjusting and controlling the arbors are provided and preferably comprise levers 58 and 58' that are connected at one end to the pivots 57 and 57' respectively and extend through the adjacent apertures, each lever extending through the aperture 50 of the adjacent arbor and also through the adjacent guideway 53. The levers assist to prevent rotation of the arbors and are adapted to cause slight longitudinal movement of the arbors. The levers extend laterally from the gear frame and have respectively a pair of arms 59 and 60 and similar arms 59' and 60', the arms of each pair being provided with wrist pins 61 and 62 respectively. The wrist pins of one pair of arms preferably are provided with shoes 63 and 64, the wrist pins of the other pair of arms being provided with similar shoes 63' and 64'. An adjuster head for operating and controlling the levers 58 and 58' is provided and preferably comprises a main portion 65 having a smooth bore 66 receiving the shaft 25, the adjuster head being arranged on the shaft between the wheel 26 and the gear frame and so as to permit both rotary and longitudinal movement on the shaft and it has inclined guides 67 and 68 to slide against the shoes 63 and 64 respectively, and oppositely inclined guides 67' and 68' to slide against the shoes 63' and 64' respectively, the adjuster head when moved longitudinally acting to force the levers apart or outwardly so as to gradually force the disks against the pinions or gear wheels, and preferably the guides are formed in grooves in the sides of wings 69 and 70 fixed on the body portion 65, so as to be enabled to force the arms each toward the other in order to draw the disks away from the pinions. The body portion 65 has a peripheral groove 71 therein. A sleeve 72 is loosely arranged on the shaft 25 outside of the gear wheel 26 and has two reach-rods 73 and 73' secured thereto that extend through guideways 74 and 74' that are provided in the wheel 26, so that the gear wheel carries the reach-rods about the shaft 25. The reach-rods are suitably connected with the adjuster head in order to move the latter along the shaft, preferably by means of a collar 75 arranged in the groove 71 and secured to the reach-rods, the collar being loose to permit it to rotate relatively to the adjuster head. The sleeve 72 has a groove 76 therein to receive a device for moving and controlling the sleeve which, as will be seen, is practically a part of the adjuster head.

The speed-changing gearing above described enables the driving-wheel 24 rotating in one direction to transmit motion to and rotate the gear wheel 26 in the same direction, as indicated in Fig. 17, and the speed of the wheel 26 relatively to the wheel 24 may be gradually varied by manipulation of the adjuster head, so as to cause the pinions or wheels 36 and 36' to act as lugs that move more or less relatively to the wheel 26 while slowly rotating on their own axis. When the disks are pressed with sufficient force against the pinions the latter are clamped and practically locked to the gear frame and consequently practically lock the gear frame to both the wheels 24 and 26, so that the wheel 26 is rotated at the speed of the driving-wheel 24 and wear or gear teeth is avoided. When the disks are withdrawn from the pinions 36 and 36' the driving-wheel 24 may rotate the pinions on their axes and consequently rotate the gear frame while the gear wheel 26 remains at rest, so that the speed-changing gearing can operate to practically disconnect the propeller shaft from the engine or to connect the shaft with the engine.

For the purpose of enabling the speed-changing gearing above described to reverse the direction of movement of the propeller shaft relatively to the shaft 23, suitable provision is made for controlling the rotary speed or stopping the rotary movement of the gear frame, suitable controlling apparatus for the purpose comprising a shaft 77 that is rotatively supported in the lower part 20 of the housing, a lever 78 secured between its ends to the shaft, and a band 79 extending about the peripheral portion 34 of the gear frame, the band being connected at one end to one end of the lever 78 by means of a hinge pin 80, the opposite end of the band being provided with an adjusting bolt 81 that coöperates with a nut 82, the nut being connected to the opposite end of the lever 78 by means of a hinge-pin 83, so that upon turning the shaft 77 in one direction the band is drawn into frictional contact with the gear frame and is retracted and spread out against the interior of the housing so as to be clear of the frame when the shaft is slightly turned in the opposite direction.

The controlling apparatus comprises also a main controller shaft 84 that is rotatively mounted in the housing part 20, and on the shaft 84 a lever for forward motion control is rotatively supported between its ends, the lever comprising a forked arm 85 that extends into the groove 76 for operating and controlling the adjuster head, the lever having an arm 86 that is provided with a laterally projecting wrist-pin 87. An arm 88 is fixedly secured to the shaft 84 and is provided with a wrist-pin 89. A gear segment 90 is fixedly secured to the shaft 84 and meshes with a gear segment 91 which is fixedly secured to the shaft 77. In a convenient arrangement of the apparatus the shaft 84 is below the shaft 25 and the arms 86 and 88 extend downwardly at a suitable distance apart and carry their wrist-pins equidistant from the shaft 84. When the driving-shaft 23 is rotating and idly rotating the gear frame the shaft 84 may be slightly rotated so as to bring the controlling band 79 close to the periphery of the gear frame and embrace the latter with more or less force, as may be required to gradually check or retard the rotary movement of the gear frame and overcome the resistance that may be imposed upon the wheel 26. When applying sufficient force to gradually retard the gear frame the latter resists the action of the pinions tending to rotate the frame and thus enables the driving-wheel 24 to turn the wheel 26 in reverse direction by reason of the reversing action of the consequently rotatably-retarded pinions. When the force is increased sufficiently to stop the rotation of the gear frame the wheel 26 may be rotated at the speed of the driving-wheel 24, since the pinions must then rotate on stationary bearings or axes.

For the purpose of insuring rapid and positive control of the speed-changing and reversing operations, novel means is provided whereby the arms 86 and 88 are simply controlled by means of a single device or prime controller, so that the forward and reverse motion systems are coupled together, and to this end a tumbling-shaft 92 is rotatively mounted in the housing part 20 parallel with the shaft 84 and lower than the latter. An arm or cam element 93 is fixedly secured to the tumbling-shaft within the housing and has a novel shifting-link or cam device 94 fixed thereon that is arranged between the arms 86 and 88. One side of the shifting-link has a groove therein that receives and guides the wrist-pin 87 to control the forward motion transmission, the groove comprising a lower portion 95 that is eccentric to the tumbling-shaft and adapted to gradually and smoothly move the arm 86 and consequently the adjuster head when the wrist-pin is in that portion of the groove, and the groove has a continuing upper portion 96 that preferably is concentric to the tumbling-shaft so that when the wrist-pin is in this portion of the groove the arm 86 is maintained at rest or retracted position while the link may be shifted slightly and hold the adjuster head in retracted position. The opposite side of the link 94 has a groove therein that receives and guides the wrist-pin 89, the groove having a lower portion 97 that preferably is concentric to the axis of the tumbling-shaft and a continuing upper portion 98 that is eccentric to said axis, so that when the link is moved to bring the wrist-pin in the upper portion 98 the arm 88 is moved and controlled so as to effect the movement and control of the band 79. When the link is moved so as to bring the wrist-pins midway between the ends of the grooves both the adjuster head and the band are in retracted position and consequently the driven element or propeller shaft is in effect disconnected from the driving-shaft or engine. As will be understood from the foregoing, while the wrist-pin 87 is acted on to swing the arm 86 the wrist-pin 89 is in the concentric groove portion 97 and maintains the arm 88 in rest position; also when the wrist-pin 89 on shifting of the link is brought into the eccentric portion 98 of the groove so as to swing the arm 88 the wrist-pin 87 is maintained in the concentric portion 96 of the groove to hold the arm 86 at rest position. The tumbling-shaft 92 extends through a suitable boxing in the wall of the housing part 20 and a prime controller is connected thereto. In order that the prime controller may be moved in a manner most natural to the operator for controlling the movement of a motor-vehicle the prime controller preferably is in the form of a lever 99 which is fixedly secured to the tumbling-shaft 92 and extends through a suitable slot in the floor 12 and beyond a suitable distance to be within easy reach of the operator when in his usual position, the upper portion of the lever preferably being approximately above the transmission shafts in order to be reached by the operator when he is on either one of the two front seats commonly provided. While only slight movements of the arms 86 and 88 are required the lever 99 is quite long in order that its upper end shall have sufficient swing to make it evident to the operator through a sense of touch or feeling that proper movements are effected, the long lever also affording ample power to enable the operator to control the machinery with but slight exertion on his part. The lever 99 is provided with a latch 100 and also a finger lever 101 that is connected to the latch by means of rods 102. A quadrant 103 is mounted upon the floor of the automobile and has closely graduated notches 104 in its forward portion and similar notches 105 in its rearward portion to receive the latch, most of the middle portion of the quadrant being devoid of notches so that the latch may slide thereon, the quadrant however having one center notch 106 to receive the latch when the lever is in mid-position indicating "mid-gear" position of the transmission gearing that permits the engine to be run while the vehicle is at rest. This arrangement permits a relatively long quadrant and a large number of notches so that fine graduation of adjustment of the retarding disks 45 and the band 79 is insured.

In order to guard against serious accident through failure of the operator to apply the vehicle brakes when they should be applied, as when the vehicle is hurriedly left standing on an inclined road or when it is necessary to quickly stop the vehicle to avoid an accident, provision is made for automatically applying the brakes when the prime controller is moved to mid-position. This is suitably accomplished by means of a stud 107 supported on the exterior of the housing part 20, and a novel brake controller mounted to rock on the stud. The brake controller comprises an arm 108 supported to turn on the stud 107, the top of the arm preferably being convexly curved and having a cam-like projection 109 on its middle portion, and an arm 110 fixed to or integrally connected with the arm 108. In the arrangement shown the arm 108 extends forwardly and the arm 110 upwardly from the supporting stud. The lever 99 has a lateral projection or contact device 111 thereon which may be moved upon the arm 108 and also caused to engage the projection 109 to force the arm downwardly to apply the brakes when the lever 99 is moved to mid-position. A coupling rod 112 is connected to the brake-rigging arm 11 and is provided with a wrist-pin 113 whereby it is connected with the arm 110, so that when the arm 110 is forced forwardly the brakes 5 and 6 are applied to slacken or stop the movement of the automobile. Preferably the arm 110 has a short uprightly-extending slot 114 from which extends an inclined slot 115, the latter extending rearwardly, and the wrist-pin 113 normally rests in the bottom of the slot 114 but may be moved upward into the slot 115 so as to slacken the brake connections and thus permit the arm 110 to be moved forward without applying the brakes, as may be desired in some cases when the automobile is coasting down hill or when it may be desired to permit the automobile to run by the force of momentum after shutting off the power therefrom. In order to control the position of the wrist-pin 113 the rod 112 is provided with a downwardly and forwardly extending arm 116 to which a link 117 is pivotally connected, the link being pivotally connected to an arm 118 fixedly secured to a shaft 119 that is rotatively mounted in suitably supported bearings under the floor 12, the shaft having a foot-lever arm 120 fixedly secured thereto that extends upward through a suitable opening in the floor so as to be conveniently operated by the operator. The arm 120 is normally held in retracted position by means of a spring 121 which is suitably connected to the arm 118 and to the housing of the gearing, the spring thus arranged causing the wrist-pin 113 to be yieldingly held in normal position in the slot 114. The arm 108 is spring-pressed to the projection 111, preferably by means of the spring 121' connected to the rod 112 and to a member of the vehicle frame.

For the purpose of enabling the engine when running at moderate or high speed to start the automobile or truck under unusual or extraordinary circumstances, as when the carrying wheels are mired or when the vehicle must ascend a steep hill and very slow speed is desired and extraordinary high power required, an auxiliary special-service gearing is provided and may be variously constructed in detail so as to be compounded with and variably controlled by the main or general-service gearing, a suitable structure, which may be arranged separately from the main gearing comprising a gear case composed of a lower or main part 122 provided with supporting brackets 123 and 124 that are secured to the vehicle frame members 1 and 2 respectively, and the top or cap part 125 secured to the lower or main part. The propeller shaft in this case is sectional, the first section of which is the shaft 25 that extends into the gear case and is journaled therein, the second section being a short shaft 126 that is arranged in alinement with the shaft 25 and rotatably supported in the gear case so as to extend from the shaft 25 rearward, the second section 126 being connected by means of a universal coupling 127 to the shaft 9 which is the third or terminal section of the propeller shaft. The shaft 126 may be provided with a supporting bearing 128 adjacent to the universal coupling. A spur-toothed gear wheel 129 is fixedly secured to the shaft 126 within the gear case and is provided on its forward side with suitable clutch devices 130. A sleeve 131 is splined on the shaft 25 and is movable toward or from the gear wheel 129 by means of a forked arm 132 that is fixedly secured to a shaft 133 horizontally supported in and extending through one side of the lower or main part 122 of the gear case. The sleeve is provided with clutch devices 134 adapted to be interlocked with the clutch devices 130 to enable the shaft 25 to directly rotate the shaft 126 when extra high power is not required. A pinion 135 is fixedly secured to the shaft 25 within the gear case. A countershaft 136 to support a back gear is supported in the gear case and a back gear mounted thereon to be moved into connection with the wheel 129 and the pinion 135. This is suitably accomplished by sliding movement of the back gear and for this purpose a relatively long hub 137 is mounted so as to slide and rotate on the countershaft 136. The hub has a peripheral groove 138 into which extends a forked arm 139 that is fixedly secured to the shaft 133, so that the shaft is enabled to simultaneously shift the clutch sleeve 131 and the hub 137, the latter having a spur-toothed gear wheel 140 fixed thereon to coöperate with the pinion 135 and having also a pinion 141 fixed thereon to coöperate with the gear wheel 129. The arrangement is such that the back gear is brought into operation only when the shafts 25 and 126 are not directly connected together by the clutch devices. The outer portion of the shaft 133 has a lever arm 142 fixedly secured thereto, and a spring 143 is connected to the arm and to the gear case for normally holding the back gear out of active position and effecting connection of the shaft 126 with the shaft 25. A connecting-rod 144 is connected to the arm 142 and also to a suitable lever arm 145 mounted on a shaft 146 below the floor 12, the arm extending upward through a suitable opening in the floor to conveniently enable the operator to shift the back gear into operative position.

It being undesirable to permit the auxiliary or special-service gearing herein described to be put into operation when the automobile is moving at such high speed as might cause stripping of the gear teeth from the wheels of the auxiliary gearing, a suitable governor for such gearing is provided which permits the auxiliary gearing to be put into or out of service only when the general service gearing is rotating at moderate speed. To this end the arm 145 is provided with a stop finger 147 that normally extends to the plane of the top of a stop plate 148 which is secured to a vertical standard or shaft 149 that is rotatively supported in the gear housing and extends through the top thereof. The standard has an arm 150 fixed thereon for moving the standard to swing the stop plate around under the stop finger so as to prevent forward movement of the lever arm 145, thus constituting a lock-out appliance for the auxiliary gearing. Within the gear housing suitable supports 151 and 152 are provided which rotatably support a governor shaft 153 to which a cone 154 is splined so as to be in contact with the arm 150 whereby to cause the stop-plate to be swung to advanced position, the cone having a shank 155 whereby to move the cone along the shaft. A collar 156 is fixedly secured to the shaft 153 and pivotally supports two bell-cranks 157 and 157', one arm of one bell-crank having a rod 158 connected thereto, one arm of the other bell-crank having a rod 158', the rods being connected to the shank 155 of the cone. The remaining arms of the bell-cranks are weighted in order that the arms shall be spread out by centrifugal force, a spring 159 connected to the weighted arms normally drawing the arms inward. A gear wheel 160 is fixedly secured to the shaft 153 and is adapted to permit the rods 158 and 158' to be moved through it. The gear wheel is in mesh with a gear wheel 161 that is fixed on the driving gear wheel 26, so that the governor is not in action when the shaft section 25 is at rest. In order to permit the arm 145 to be advanced for putting the auxiliary gearing into operation the stop plate 145 is retracted by suitable means, as by a spring 162 connected to the stop-plate and also to an anchor piece 163 secured to the gear housing, the spring acting to hold the arm 150 in contact with the cone 154, so that as the cone is retracted the arm 150 is swung in to the apex of the cone while the stop-plate 148 is retracted from beneath the stop-finger 147. The governor or controller described is only one of the types of governor mechanism that might be adapted for the purpose.

In practical use, considering the invention as applied to an automobile or motor-truck, it will be apparent from the foregoing description that all the ordinary movements of the vehicle are controlled by means of the prime controller or lever 99 which is simply moved forward or backward by one hand of the operator without any probability of confusion. When the vehicle is at rest the lever 99 is normally in mid-position and holds the automobile brake in active position so that accidental movement of the vehicle is prevented. The engine may be started as is customary and run at maximum speed, resulting in the rotation of the wheels 24 and 36 and also the gear frame while the lever 99 is in mid-position so as to hold the link 94 in mid-position, the wheel 26 being prevented from rotating since it is practically connected with the driving-wheels which are at rest. Normally the shaft 25 is connected with the shaft 126 through the action of the spring 143. If it is desired to use the auxiliary gearing in order to start the vehicle the lever arm 145 is pushed forward while the vehicle is at rest, and this may be done when the vehicle is moving at slow speed, with the result that the clutch sleeve 131 is disconnected from the gear wheel 129 so as to disconnect the shafts 25 and 126, following which operation the wheel 140 is brought into engagement with the pinion 135, the latter being relatively broad faced, immediately following which the pinion 141 is brought into engagement with the gear wheel 129. It being on most occasions unnecessary to use the auxiliary gearing a great length of time it is preferably maintained in commission by the operator temporarily holding the arm 145. After putting the auxiliary gearing into commission the lever 99 may be moved as required, and if moved forward the operator forces it gently forward sufficiently to cause slight retarding movement of the pinions 36 on their axes which causes slight increase of the rotary speed of the gear frame, which results in the gradual starting of the wheel 26 which rotates the shaft 25 whereby the auxiliary gearing is put into action. If at first movement of the lever 99 the frictional contact with the pinions 36 is not sufficient to overcome the resistance imposed by the standing vehicle, additional pressure is put upon the lever 99 until the resistance is overcome and the vehicle is gradually started. Thus the vehicle may be run at very slow and controllable speed and with the maximum power of the engine applied. In some cases the vehicle may gain in speed more than is desired, in which case the lever 99 is slightly drawn backward until the desired speed is maintained. In case it is desired to run the vehicle at moderately high or at maximum speed the lever arm 145 is released while going at low speed and the spring 143 automatically throws the auxiliary gearing out of commission and causes the shaft 126 to be directly connected to the shaft 25. Greater speed is attained when the lever 99 is moved farther forward so as to cause greater retardation of the pinions 36 on their axis, the maximum speed being attained by pushing the lever 99 forward sufficiently to cause the pinions 36 to be practically locked to the gear frame and also to the wheels 24 and 26, so that all must rotate about the shafts 23 and 25 at engine speed. The governor will be so adjusted that when the shaft 25 is rotating at moderate or relatively high speed the governor arms are spread out so as to cause the cone 154 to be advanced to move the stop plate 148 under the finger 147, thus preventing the auxiliary gearing from being put into operation through accident or thoughtlessness on the part of the operator. If the plate 148 is moved above the finger 147, the arm 145 is not released until speed is reduced. In case it is desired to run the vehicle backward it is only necessary to move the lever 99 backward and graduate it as may be necessary to attain the desired speed, which is a great advantage when necessary to run backward a considerable distance since the speed may be increased as may be desired. When necessary to shift the automobile to place it in any desired position the operation is advantageously performed without risk of slight accidents, since the lever 99 when moved to mid-position to cut off the power, automatically applies the brakes and thus enables the operator to instantly stop the vehicle when moving slowly. In case it is not desired to apply the brakes it is only necessary to hold the lever slightly away from mid-position, or to place the foot upon the arm 120 and press it slightly forward to prevent automatic action, and thus the brakes may be released wholly or partially if desired without shifting the lever 99. When the lever 99 is moved backward the shifting-link 94 is carried downward so as to bring the connections into operation to contract and draw the band 79 to the periphery of the gear frame. While force is being exerted the band frictionally engages the peripheral portion 34 and causes slight retardation of the gear frame which enables the pinions 36 to start the wheel 26 in reverse direction, additional force applied to the lever 99 resulting in additional frictional resistance of the gear frame which results in the increase of speed of the wheel 26. If sufficient force be applied to the lever 99 the rotation of the gear frame will be stopped by the band 79 and result in the wheel 26 being driven at the speed of the driving wheel 24. It will be understood that the main gear housing and the casing of the auxiliary gearing will contain lubricating oil, so as to insure silent operation of the gearing and also prevent unusual wear and chattering of the frictional resisting surfaces whereby the changes of speed are effected. Also proper material will be employed to attain the best results. If for any reason the vehicle brakes do not afford sufficient power to stop the vehicle when running, the lever 99 after having been moved to mid-position may be instantly moved farther so as to indicate a reversal of motion, with the result that the power of the engine will be exerted to retard the rotation of the propeller shaft 25, through the action of the retarding devices 45 or the device 79, depending upon the direction of movement, resulting in slowing down and finally stopping the vehicle. The wheel 24, gear frame and pinions together serve as a balance wheel for the engine.

Having thus described the invention, what is claimed as new is—

1. A lubricant-holding casing controllable friction-contact-action speed-changing transmission gearing in the casing, and an adjustable controller having controlling connection with the gearing and provided with graduating and position-holding means.

2. Transmission and controlling gearing including reversing transmission gearing, two series of means to control action of the gearing, and a pivoted lever having controlling connection with the two series of means and provided with graduating and position-holding means.

3. Transmission and controlling gearing including reversing speed-changing transmission gearing, two series of graduated movable means adapted for controlling the speed-changing transmission gearing definitely and graduatedly and direction of motion transmitted, and a graduating controller connected with the two series of movable means.

4. Transmission and controlling gearing including reversing speed-changing transmission gearing, an operative graduated primary controller, and two series of graduatedly controllable movable means connected with the primary controller for graduatedly controlling the speed-changing transmission gearing for speed and direction of motion transmitted.

5. Transmission and controlling gearing including a driving-shaft, a driven-shaft, and graduatedly controllable reversing transmission gearing connected constantly with the shafts and provided with definitely graduating controlling means for enabling the gearing to transmit motion at different speeds from the driving-shaft to the driven-shaft in either forward or reverse direction.

6. Reversing motion-transmission gearing including two rotary shafts and adjustable means adapted to connect one with the other of the shafts either for direct or for reverse-motion drive, the adjustable means having two series of controlling devices provided with a graduated position-holding operating-lever, and a lubricant-holding gear case to support the shafts and the adjustable means and also the controlling devices.

7. Transmission and controlling gearing including a rotatable frame, a rotatable driving-wheel, a driven-wheel, a pinion rotatably mounted on the rotatable frame in connection with the driving-wheel and the driven-wheel, means for graduatedly increasing the rotary speed of the frame relatively to the driving-wheel, and means for graduatedly decreasing the rotary speed of the frame relatively to the driving-wheel.

8. Transmission and controlling gearing including a driving-wheel, a driven-wheel, a rotatable gear frame, a pinion rotatable on the gear frame and connected with the driving-wheel and the driven-wheel, and a plurality of series of graduatedly controlled controlling means coupled together with relatively sliding connections for either increasing or decreasing the rotary speed of the gear frame to graduatedly control the direction of motion of the driven wheel relatively to the driving-wheel.

9. Transmission and controlling gearing including a driving-wheel, a driven-wheel, a rotatable gear frame, a pinion rotatably mounted on the gear frame in connection with the driving-wheel and the driven-wheel, the gear frame movably controlling the position of the axis of the pinion relatively to the driving-wheel, and graduated means acting to definitely control the rotation of the gear frame graduatedly for either advancing or retarding and definitely maintaining the position of the axis of the pinion relatively to the driving-wheel.

10. Transmission and controlling gearing including a driving-wheel, a driven-wheel, a rotatable frame, a pinion rotatable in the frame in connection with the driving-wheel and the driven-wheel and having a frictional contact face on one side thereof separate from its rotary axis, a retarding device adjustably mounted in the frame to be held in different positions and adapted to coöperate with the contact face, and graduatedly controllable means mounted in and coöperating with the frame to graduatingly adjust the retarding device to the contact face of the pinion.

11. Transmission and controlling gearing including a driving-wheel, a driven-wheel, a rotatable gear frame, a pinion rotatable on the gear frame in connection with the driving-wheel and the driven-wheel, a series of controlling devices adapted to coöperate to control the rotary speed of the gear frame for graduatedly varying the speed of the driven-wheel in one direction, a series of controlling devices adapted to coöperate to control the rotary speed of the gear frame for reversing and graduatedly varying the speed of the driven wheel in the reverse direction, and definitely graduating means for synchronously controlling the two series of controlling devices.

12. A compound transmission gearing including a driving-shaft, a sectional driven-shaft in alinement with the driving shaft, a frictional-resistance reversible speed-changing main gearing for connecting the first section of the driven-shaft with the driving-shaft, a toothed-wheel auxiliary gearing having a constant speed-ratio and adapted for connecting the second section with the first section of the driven-shaft to be actuated and varied in speed by means of the main gearing, and means enabling the main gearing to control the periods of operation of the auxiliary gearing.

13. A transmission gearing including a driving-wheel rotatable in one direction, a rotatable driven-wheel, and transmission means having continuous connection with both wheels to be actuated by the driving-wheel and provided with graduatedly controlled controlling means between the wheels enabling the transmission means to rotate the driven-wheel at different speeds in either the one or the reverse direction and at graduated variable speeds.

14. Transmission and controlling gearing including reversing speed-changing transmission gearing, an operative primary controller, two series of movable means for controlling the speed-changing gearing and direction of motion transmitted, the two series of means being connected with the primary controller for movement and control thereof, a brake rigging, and means enabling the primary controller to operate the brake rigging.

15. A transmission gearing including a toothed driving-wheel, a toothed driven-wheel, a rotatable frame between the driving-wheel and driven wheel and a toothed pinion rotatably mounted in the frame and meshing on one side with the driving-wheel and on the opposite side of its axis with the driven-wheel and provided with a graduatedly controlled retarding device frictionally contacting with the pinion to gradually reduce the speed to a definitely different speed and subsequently stop the rotation of the pinion.

16. A transmission gearing including a rotatable frame, a pinion rotatably mounted on the frame, a rotatable driving-gear wheel and a rotatable driven-gear wheel in mesh with the pinion on opposite sides respectively of the axis of the pinion, and graduatedly controlled means for enabling the pinion to gradually change and control the rate of rotation and to maintain the changed rate of the frame during a constant rate of rotation of the driving-gear wheel to rotate and graduatedly vary the speed of the driven-gear wheel.

17. A transmission gearing including a rotatable driving-gear wheel, a rotatable driven-gear wheel, a rotatable frame, a pinion rotatable on the frame in mesh with both gear wheels, and graduatedly controlled means for variably retarding and determining the rate of rotation of the frame to enable the pinion to transmit motion at definitely different speeds from the driving-gear wheel to the driven-gear wheel in reverse direction relatively to the driving-gear wheel and at variable speed.

18. Transmission and controlling gearing including a constant driver, a sectional driven shaft, a primary gearing having means for transmitting motion from the constant driver at gradually varying speeds to the first section of the driven shaft, an auxiliary gearing to coöperate with the driven shaft to arbitrarily reduce the speed of the second section of the shaft, and governing means controlled by the primary gearing for controlling the periods of action of the auxiliary gearing.

19. A transmission gearing including a driving-wheel rotatable in one direction, a rotatable driven-wheel, reversing transmission means having graduatedly controlled connection with both wheels to variably be actuated by the driving-wheel, an operative primary controller, and two series of controlling means including relatively sliding connections and connected with the controller and connectible with and enabling the transmission means to rotate the driven-wheel in either the one or the reverse direction at variable and definitely different speeds.

20. A transmission gearing including a rotatable bevel-toothed driving-wheel, a rotatable bevel-toothed driven wheel, a gear frame rotatably guided between the driving-wheel and the driven wheel, a bevel-toothed pinion rotatably mounted in the gear frame and meshing with the driving-wheel and the driven wheel, the pinion having a continuous and smooth contact-face thereon, and a retarding device movably supported on the gear frame and adapted for frictional-resistance contact with the contact-face of the pinion, the retarding device being provided with controlling means mounted in the gear frame.

21. A transmission gearing including a driving-shaft rotatable in one direction, a rotatable driven-shaft, and variable reversing speed-changing gearing having continuous mechanical connection with the driving-shaft and the driven-shaft, the gearing being provided with two series of interconnected graduatedly controllable controlling devices including coöperating graduatedly controlled sliding frictional-resistance elements adapted for assisting the gearing in transmitting motion and gradually changing the speed of the driven-shaft to a definitely different speed relatively to the driving-shaft and reversing the direction of motion of the driven-shaft relatively to the driving-shaft.

22. A transmission gearing including a driving-shaft rotatable in one direction, a rotatable driven-shaft, and variable reversing speed-changing gearing having continuous mechanical connection with the driving-shaft and the driven-shaft, the gearing being provided with two series of interconnected graduatedly controllable controlling devices including coöperating graduatedly controlled sliding frictional-resistance elements adapted for assisting the gearing in transmitting motion from the driving to the driven shaft at gradually varying or a definitely different speed and in either the one or the reverse direction, the gearing and controlling devices enabling the rotating driving-shaft to retard and stop the rotation of the driven-shaft when rotating in either direction.

23. Transmission and controlling gearing including a driving wheel to rotate in forward direction, a rotatable driven wheel, speed-changing and reversing gearing having a movable element in continued engagement with the driving wheel and the driven wheel, a series of controlling means for the gearing enabling the driving-wheel to rotate the driven wheel at variable speed in the forward direction, a series of controlling means for the gearing enabling the driving-wheel to rotate the driven wheel at variable speed in the reverse direction, and a movably supported prime controller provided with a shifting-link having sliding controlling connection with the two series of controlling means.

24. A transmission gearing including a rotatable driving-wheel, a rotatable driven wheel, a gear frame rotatably guided between the driving-wheel and the driven-wheel and having a smooth peripheral contact-face thereon, a pinion rotatably mounted in the gear frame and meshing with the driving-wheel and the driven-wheel, and a contractible retarding device movably supported adjacent to the contact-face and adapted for frictional-resistance contact with the contact-face of the gear frame, the retarding device being provided with supported graduatedly controlled controlling means to force the device under graduated control to the contact-face whereby to gradually retard or stop rotation of the gear frame and enable the driving-wheel to rotate the pinion and the pinion to rotate the driven-wheel at gradually varying speeds or at a definitely different speed in the direction reverse to that of the driving-wheel.

25. Transmission and controlling gearing including a driving-wheel to rotate in one direction, a rotatable driven-wheel, a gear frame guided to rotate about the axis of the driving wheel, a pinion rotatably mounted on the gear frame and meshing with the driving-wheel and the driven-wheel to enable the driving-wheel to rotate the driven-wheel, two series of definitely controllable controlling means movably supported, one of the series being adapted to graduatedly coöperate with the pinion to vary the rate of rotation of the driven-wheel in the one direction, the other of the series of controlling means being adapted to graduatedly coöperate with the gear frame to enable the driving-wheel and the pinion to rotate the driven-wheel at variable speed in the reverse direction, and a primary controller movably supported and provided with sliding connection graduating means operatively connecting the controller with the two series of controlling means for enabling the controller to gradually and graduatedly move the controlling means alternately.

26. In reversing speed-changing transmission gearing, the combination of a rotatable driving-wheel, a rotatable driven-wheel, graduatedly controllable variable-speed gearing constructed and arranged to be moved by the driving-wheel about the axis of rotation of the wheel and adaptable for rotating the driven-wheel at gradually-variable speed or at different definite speeds either in one direction or in the reverse direction, a movable prime controller provided with two reversely-operating controlling and position holding devices, a series of controlling means for the variable-speed gearing to coöperate therewith to connect the driven-wheel with the driving-wheel whereby to rotate the driven-wheel in one direction, and another series of controlling means for the variable-speed gearing to coöperate therewith to connect the driven-wheel with the driving-wheel whereby to rotate the driven-wheel in the opposite direction, one of the series of controlling means being operatively connected with one of the two controlling and position holding devices, the other one of the series of controlling means being operatively connected with the remaining one of the two controlling and position holding devices.

27. In reversing speed-changing transmission gearing, the combination of a crank-shaft having a level-toothed driving-wheel fixedly secured thereto, a propeller shaft in alinement with the crank-shaft and having a dished bevel-toothed driven-wheel fixedly secured thereto opposite to the driving-wheel, a gear frame rotatably guided on the crank-shaft and the propeller shaft between the driving-wheel and the dished driven-wheel, a plurality of bevel-toothed pinions rotatably mounted in the gear frame in mesh with the driving-wheel and the driven-wheel, a plurality of controllable devices mounted in the gear frame between the pinions for gradually retarding rotation of the pinions on their axes respectively, an adjuster mounted between the gear frame and said driven-wheel for operatively controlling the plurality of controlling devices, and means for gradually retarding rotation of the gear frame.

28. In speed-changing transmission gearing, the combination with a crank-shaft, a propeller shaft, a toothed driving-wheel secured to the crank-shaft, a toothed driven wheel secured to the propeller shaft, and a gear frame rotatably guided between the driving-wheel and the driven wheel, of a toothed pinion rotatably mounted in the gear frame in mesh with the driving-wheel and the driven wheel and having an annular friction-contact face, a retarding device adjustably mounted in the gear frame adjacent to the friction-contact face to frictionally engage the face, and controlling means movably mounted in the gear frame and controlling the adjustability of the retarding device on the friction-contact face of the pinion.

29. A transmission gearing comprising a shaft having a gear wheel affixed thereto, a second shaft having a gear wheel similar to and arranged opposite to the first gear wheel, a frame rotatable between and on a common axis with the gear wheels, pinions journaled on the frame on opposite sides of the axis of the gear wheels, said pinions being in constant connection with the gear wheels, means radially opposite to the frame for checking its rotation, and means for checking the axial rotation of the pinions.

30. A transmission gearing comprising a shaft having a gear wheel affixed thereto, a second shaft alining with the first and having a gear wheel affixed to it, a frame turning on an axis common to the axis of the gear wheels and having a braking surface, pinions journaled on the frame and connecting with the gear wheels on opposite sides of the axis of the latter, a controllably contractible brake for engaging the braking surface of the frame, means for controlling the contraction of the brake, and a brake controlling the axial rotation of the pinions.

31. In reversing transmission and controlling gearing, the combination of a crank-shaft, a propeller shaft, reversing drive gearing for connecting the propeller shaft with the crank-shaft, a prime controller for the drive gearing and movable to and fro, the controller having a mid-position in which to disconnect the drive gearing operatively from the propeller shaft, an operable brake rigging, movable means adapted to enable the controller on movement to mid-position to automatically operate the brake rigging, and a lever having operative connection with the movable means to modify or prevent operation of the brake rigging by the controller.

32. In transmission and controlling gearing, the combination of a propeller shaft, driving gearing to be operatively connected with the propeller shaft, operable brake apparatus whereby to stop the propeller shaft, a pivoted brake-controller forward of the apparatus and comprising an upwardly-extending arm having an upwardly and rearwardly-extending slot, a brake-rod having a pivot pin that extends movably in the slot, a prime controller for the driving gearing, means connected with the brake-rod to control the pivot pin in the slot, and means enabling the prime controller to control the brake-controller.

33. A transmission gearing comprising a shaft and a gear wheel affixed thereto, a second shaft alining with the first and having a gear wheel affixed thereto, a frame rotatable on an axis common to that of the gear wheels and having a braking surface, a controllable contractible brake for said surface, pinions journaled on the frame and connecting with the gear wheels on the opposite sides of their axis, a brake controlling the axial rotation of the pinions, and a single lever provided with a graduating and position-holding device having an operative connection with both the aforesaid brakes.

34. In reversing speed-changing transmission gearing, the combination with a driving-shaft and an alining driven-shaft with a driven-wheel thereon, of rotatable gears connecting the driven-wheel with the driving-shaft and rotatable by the driving-shaft in one direction, and two interconnected series of graduatedly controlled friction-contact controlling means for enabling the rotatable gearing while rotating in the one direction to rotate the driven-wheel at gradually-variable speed or at a definitely different speed in either the one or the reverse direction relatively to the driving-shaft.

35. In speed-changing transmission gearing, the combination with a driving-shaft and an alining driven-shaft with a driven-wheel thereon, of rotatable gears connecting the driven-wheel with the driving-shaft and rotatable by the driving-shaft in one direction, and friction-contact controlling means provided with graduatedly controlled operating means enabling the rotatable gearing while rotating in the one direction to rotate the driven-wheel at gradually-variable speed or at a definitely different speed in the reverse direction relatively to the driving-shaft.

36. In speed-changing transmission gearing, the combination with a crank shaft, a propeller shaft, a driving-wheel secured to the crank-shaft, and a driven-wheel secured to the propeller shaft, of graduatedly controllable movable means guided to rotate between the driving-wheel and the driven-wheel and connected with both the wheels to be rotated by the driving-wheel, and graduatedly controlled controlling means coöperating with the movable means to enable the movable means to transmit motion at graduated speed to the driven-wheel.

37. In reversing speed-changing transmission gearing, the combination of a rotatable driving-wheel, a rotatable driven-wheel, graduatedly controllable variable-speed gearing guided to be moved by the driving-wheel about the axis of rotation of the wheel, and two series of graduatedly controlled controlling means for the variable-speed gearing to coöperate separately therewith for transmitting motion from the driving-wheel rotating at constant speed in one direction to the driven-wheel at gradually-variable speed or at definitely different speeds either in the one direction or in the reverse direction.

38. In reversing transmission and controlling gearing, the combination of a crank-shaft, a propeller shaft, reversing drive gearing for connecting the propeller shaft with the crank-shaft, operable brake apparatus for the propeller shaft, a movable prime controller operatively connected with the drive gearing and having a mid-position at which it is enabled to disconnect the propeller shaft from operative connection with the crank-shaft, and means for enabling the prime controller when moved to mid-position to automatically operate the brake apparatus.

39. In reversing transmission and controlling gearing, the combination of a rotatable driving-wheel, a rotatable driven-wheel, reversing transmission gearing having a movable element in continued engagement with the driving-wheel and the driven-wheel, a series of controlling means including a movably-guided device to enable the gearing to transmit motion from the driving-wheel to the driven-wheel in one direction, a series of controlling means including a movably-guided device to enable the gearing to transmit motion from the driving-wheel to the driven-wheel in the reverse direction, and connecting and controlling means adjustably supported and having actuating connection with the movably-guided devices of the two series of controlling means.

40. In a compound transmission and controlling gearing, the combination of a constant driver, a reversing primary gearing to be driven by the constant driver, a propeller shaft to be driven in either forward or reverse direction by the primary gearing and provided with a non-reversing auxiliary gearing having a speed-reducing ratio, the auxiliary gearing having operating means for connecting the gearing with or disconnecting it from the propeller shaft, and means controlled by the primary gearing adapted for governing the periods of actuation of the operating means.

41. In a compound speed-changing transmission gearing, the combination of a driving-shaft, a propeller shaft comprising a first section and a second section, clutch means for connecting the sections of the propeller shaft together, reversing primary gearing for connecting the first section of the propeller shaft with the driving-shaft, an auxiliary gearing for connecting the second section with the first section of the propeller shaft and adapted to reduce the speed of the second relatively to the first section, operating means for the auxiliary gearing provided with a shifter for the clutch means, locking means operable to prevent actuation of the operating means, and means to be actuated by the primary gearing for controlling the operation of the locking means.

42. In reversing speed-changing transmission gearing, the combination with a driving-shaft and an alining driven-shaft, of graduatedly movable inter-connected means connecting the driven-shaft with the driving-shaft and having graduatedly controlled sliding frictional-resistance elements coöperating to enable the movable means to reversibly transmit motion at gradually varying or a selected speed from the driving-shaft to the driven-shaft.

43. In reversing speed-changing transmission gearing, the combination with a driving-shaft and an alining driven-shaft with a driven-wheel thereon, of rotatable graduatedly variable gearing connecting the driven-wheel with the driving-shaft and rotatable by the driving-shaft in one direction, and inter-connected graduatedly controlled friction-contact controlling means enabling the rotatable gearing to reversibly rotate the driven-wheel at a selected or a gradually-variable speed.

44. A transmission gearing comprising a shaft having a gear wheel affixed thereto, a second shaft alining with the first shaft and having a similar gear wheel affixed thereto, a rotatable frame arranged between the gear wheels and turning on an axis common to that of the gear wheels, pinions journaled on the frame on opposite sides of the axis of the gear wheels, said pinions being in constant contact with the gear wheels, a braking surface on the aforesaid frame, a brake engaging said surface, a second brake engaging the pinions, and means for selectively operating the aforesaid brakes.

45. In transmission and controlling gearing, the combination with a propeller shaft, reversing driving gearing to be operatively connected with the propeller shaft, an operable brake apparatus, and controlling means having a prime controller supported to be moved to or fro to control the driving gearing, the prime controller having a mid-position in which to disconnect the driving gearing from the propeller shaft, of operable means enabling the controlling means on movement of the prime controller to mid-position to automatically operate the brake apparatus and to automatically release the brake apparatus on movement from mid-position.

46. In reversing transmission gearing, the combination of a driving-wheel to rotate in forward direction, a rotatable driven-wheel, reversing transmission gearing having a movable wheel in continued engagement with the driving-wheel and the driven-wheel, a series of operable controlling means for the transmission gearing enabling the driving-wheel to actuate the gearing and rotate the driven-wheel in the forward direction, a series of operable controlling means for the gearing enabling the driving-wheel to actuate the gearing and rotate the driven-wheel in the reverse direction, and a movably supported prime controller provided with movable connecting means having operative and controlling connection with the two series of controlling means for operating either one of the two series of controlling means and at the same time holding the other of the series inoperatively.

47. In speed-changing transmission gearing, the combination of a rotatable sectional propeller shaft, each section alining with each other, toothed constant-speed gearing to connect the first to the second section of the shaft and adapted to rotate the second section at reduced speed relatively to the first section, a driving-shaft in alinement with the propeller shaft, reversing main gearing adapted for connecting the first section of the propeller shaft with the driving-shaft and provided with means for gradually varying the speed of the propeller shaft relatively to the driving-shaft and reversing the direction of motion of the propeller shaft, the main gearing being adapted to control and to act to gradually increase the speed of the propeller shaft and the constant-speed gearing, and controlling means for the toothed gearing provided with locking means controlled by the main gearing.

48. In transmission gearing, the combination of a rotatable gear frame having a journal-bearing and having also a guide socket in alinement with the journal-bearing, a pinion having a journal on one side and a smooth contact-face on the opposite side thereof, the pinion having also a central axle-bore, a driving-wheel connected with the pinion, a driven wheel to be rotated by the pinion, an arbor longitudinally guided in the guide socket and having an axle portion extending into the axle-bore of the pinion, a disk fixedly secured to the arbor and having a smooth contact-face adjacent to the contact-face of the pinion, a device for preventing rotation of the arbor in the guide socket, and means for controlling the arbor.

49. In transmission gearing, the combination of a rotatable driven shaft, a gear frame rotatable on the shaft, a pinion rotatably mounted in the frame and having a smooth contact-face, a driving-wheel connected with the pinion, a gear wheel fixedly secured to the driven shaft to be driven by the pinion, a disk arranged adjacent to the pinion and having a smooth contact-face opposite to the contact-face of the pinion to be adjusted thereto, an arbor fixedly secured to the disk and movably guided in the gear frame to adjust the disk, the arbor having an aperture therein, a lever pivoted to the gear frame and extending into the aperture to move the arbor, and a controlled adjuster-head movable on the driven shaft and having an inclined guide engaging and controlling the lever.

50. In speed-changing transmission gearing, the combination of a rotatable driven shaft, a gear frame rotatable on the shaft, a pinion rotatably mounted in the frame and having a smooth contact-face, a driving-wheel connected with the pinion, a gear wheel fixedly secured to the driven shaft to be driven by the pinion and having a guideway therein, a disk arranged adjacent to the pinion and having a smooth contact-face opposite to the contact-face of the pinion to be adjusted thereto, means including a lever pivoted to the gear frame for forcing the disk with variable pressure to the pinion, an adjuster-head movably guided on the driven shaft and controlling the lever, the adjuster-head having a peripheral groove, a collar rotatable in the groove, a reach-rod secured to the collar and extending movably through the guideway of the gear wheel, and a controlled sleeve movable on the driven shaft and connected to the reach-rod.

51. In reversing speed-changing transmission gearing, the combination of a crank-shaft, a rotatable propeller shaft, controllable drive gearing having connection with the crank-shaft and the propeller shaft and provided with forward-motion friction-contact controlling devices to coöperate with the drive gearing for transmitting motion from the crank-shaft and at gradually-variable speed in forward direction to the propeller shaft, the drive gearing being provided also with reverse-motion friction-contact controlling devices to coöperate with the drive gearing for transmitting motion from the crank-shaft and at gradually-variable speed in the reverse direction to the propeller shaft, a series of movable adjusting means for gradually adjusting pressure on the forward-motion controlling devices, another series of movable adjusting means for gradually adjusting pressure on the reverse-motion controlling devices, a pivoted prime controller lever, means operatively connecting the two series of adjusting means with the lever and adapted to enable the lever to operatively adjust each of the series of means separately, and means for latching the lever.

52. In speed-changing transmission gearing, the combination of a crank-shaft, a rotatable propeller shaft, controllable drive gearing having connection with the crank-shaft and the propeller shaft and provided with a plurality of pairs of friction-contact controlling devices coöperating with the drive gearing to transmit motion from the crank-shaft and at gradually variable speed to the propeller shaft, movable adjusting means including a wedge-like element and devices controlled thereby for gradually adjusting pressure on the controlling devices, a pivoted prime controller lever, means operatively connecting the adjusting means with the lever and including a cam-like element and a device controlled thereby adapted to enable the lever to gradually move the adjusting means, a supported quadrant, and means mounted on the lever for graduatedly latching the lever to the quadrant.

53. A transmission gearing comprising a shaft having a gear wheel affixed thereto, a second shaft alining with the first and having a similar gear wheel affixed thereto, a rotatable frame journaled between the gear wheels and rotating on an axis common to that of the gear wheels, pinions journaled on the frame and connecting the gear wheels, a braking surface on the frame, a brake engaging said braking surface, a brake engaging a portion of the pinions, a sliding collar on one of said shafts, an operative connection between said collar and the brakes of the pinions, and a lever operatively connected with the first mentioned brake to operate it and also operatively connected with the aforementioned collar to slide it.

54. In compound speed-changing transmission gearing, the combination of a crank-shaft, a propeller shaft comprising a first section and a second section, means for locking the sections of the propeller shaft together, gradually-adjustable variable-speed gearing connecting the first propeller shaft section with the crank-shaft, a toothed-wheel auxiliary gearing for connecting the second section with the first propeller shaft section and provided with controlling means including a movable lever, the controlling means controlling also the locking means, lock-out means operable to prevent operation of the foot-lever, governor means driven by means of the first propeller shaft section and adapted to be controlled by centrifugal force to operate or retract the lock-out means, and controlling means for the variable-speed gearing including an adjustable prime controller.

55. In reversing speed-changing transmission gearing, the combination of a driving-wheel to rotate in one direction, a rotatable propeller shaft, a driven wheel secured to the propeller shaft, a gear frame rotatable on the propeller shaft and provided with an adjustable friction-contact controlling device, the frame having a cylindrical periphery, a pinion rotatably mounted in the gear frame and having connection with the driving-wheel and the driven wheel, the pinion having a continuous smooth face to be engaged by the controlling device for gradually varying the rotary speed of the pinion and the gear frame relatively to the driving-wheel, a movable adjuster for the controlling device, and an adjustable friction-contact controlling device to engage the periphery of the gear frame for gradually varying the rotary speed of the gear frame and rate of rotation of the pinion to reverse the motion of the driven wheel, the latter controlling device being provided with a movable adjuster.

56. In reversing speed-changing transmission gearing, the combination of a rotatable propeller shaft, a driven wheel secured to the shaft, a gear frame rotatable on the shaft and provided with controllable variable-speed means for connecting the frame to the driven wheel, the frame having a cylindrical periphery, adjusting means for controlling the variable-speed means and including a sleeve movably guided on the propeller shaft, a friction-contact band extending about the periphery of the frame and provided with an operating-appliance to draw the band to the periphery, a controller shaft rotatively supported and connected with the operating appliance, a lever pivoted on the controller shaft and controlling said sleeve, an arm fixedly secured to and controlling the controller shaft, and means for simultaneously controlling the lever and the arm.

57. In speed-changing transmission gearing, the combination of a rotatable driving-shaft, a rotatable propeller shaft, a driving gear wheel secured to the driving-shaft, a driven gear wheel secured to the propeller shaft and having a plurality of guideways therein, a gear frame rotatably guided on the driving-shaft and the propeller shaft between the driving gear wheel and the driven gear wheel and having a plurality of radial arbors therein and guided for longitudinal adjustment, each arbor having a transverse aperture therein, a plurality of pinions rotatably guided in the gear frame and on the arbors respectively, the pinions meshing with the driving gear wheel and the driven gear wheel, each pinion having an annular friction-contact face on the inner side thereof, a plurality of retarding devices fixedly connected to the arbors respectively adjacent to the inner side of the pinions respectively, each device having an annular friction-contact face to engage the face of the adjacent pinion, a plurality of controlling levers pivoted to the gear frame and extending through the apertures of the arbors respectively, and an adjuster head movably mounted on the propeller shaft between the gear frame and the driven wheel and having controlling connection with all the levers to adjust the pressure of the retarding devices on the pinions, the head having controlling means extending through the guideways of the driven wheel.

58. In reversing speed-changing transmission gearing, the combination of a driving propeller shaft section and a driven shaft section rotatably arranged in alinement each with the other, each section having a clutch device of which one is movable to or from the other for connecting the driven section with or disconnecting it from the driving section, a crank-equipped shaft rotatably arranged in alinement with the driving propeller shaft section, a unitary graduatedly-adjustable reversing variable-speed main gearing for connecting the driving propeller shaft section with the crank-equipped shaft, governing means controlled by the main gearing and a unitary auxiliary gearing adapted for connecting the driven shaft section with the driving propeller shaft section when the movable clutch device is disconnected from the other clutch device, the auxiliary gearing being provided with controlling means to be locked by the governing means and also having a single speed-ratio which is to be graduatedly varied and controlled by the main gearing.

59. In a compound speed-changing and controlling gearing, the combination of a crank shaft, a reversing speed-changing general-service gearing to be driven by the crank-shaft, a propeller shaft to be driven by the general-service gearing and provided with an auxiliary gearing having a speed-reducing ratio to be varied by the general-service gearing, controlling means for the auxiliary gearing, and means enabling the general-service gearing to govern the periods of operation of the controlling means.

60. In transmission and controlling gearing, the combination with reversing speed-changing transmission gearing, an operative primary controller, and two series of movable means for controlling the speed-changing of the transmission gearing and direction of motion transmitted, of graduating means including cam-like devices controlled by the primary controller and operatively connected with and controlling the two series of movable means to effect gradual changing of speed by the transmission gearing.

61. In transmission and controlling gearing, the combination of reversing speed-changing transmission gearing, an operative primary controller, and two series of movable means for controlling the transmission gearing speed-changing operations and direction of motion transmitted, with graduating means operatively connected with the primary controller and operatively connecting the controller with the two series of movable means, the graduating means including cam-like devices enabling the controller to apply controlled graduated pressure to the movable means for effecting graduated variable changing of speed by the transmission gearing.

62. In speed-changing transmission and controlling gearing, the combination of a crank shaft, a propeller shaft, gearing having means for transmitting motion from the crank shaft at gradually varying speeds to the propeller shaft, the gearing being provided with sliding-contact elements adapted to withstand wear in continued sliding movement for controlling the variations of speed transmitted, and graduatedly-controllable means including cam-like devices for graduatedly varying and controlling the pressure of co-acting sliding-contact elements to effect the variations of speed.

63. In transmission gearing, the combination of a rotatable bevel-toothed driving-wheel, a rotatable bevel-toothed driven-wheel, a gear frame rotatably guided between the driving-wheel and the driven-wheel, and a bevel-toothed pinion rotatably mounted in the gear frame and provided with graduatedly controlled retarding means for graduatedly varying the rate of rotation thereof, the pinion being in engagement with the driving-wheel and the driven-wheel, with graduatedly controllable means for controlling the action of the retarding means.

64. In transmission and controlling gearing, the combination of a driving-wheel to rotate in forward direction, a rotatable driven-wheel, speed-changing and reversing gearing having a rotary element in continued engagement with the driving-wheel and the driven-wheel, a series of controlling means for the gearing enabling the driving wheel to rotate the driven wheel at variable or a continued definite intermediate speed in the forward direction, a series of controlling means for the gearing enabling the driving-wheel to rotate the driven-wheel at variable or a continued definite intermediate speed in the reverse direction, and cam-like graduatedly-acting means operatively connecting the two series of controlling means together for synchronous control thereof.

65. In transmission and controlling gearing, the combination of a crank-equipped driving-shaft having a bevel-toothed driving-wheel fixedly secured thereto, and a propeller shaft in alinement with the driving-shaft and having a bevel-toothed driven-wheel fixedly secured thereto opposite to the driving-wheel, with a gear frame rotatably guided to turn about the axis of the driving-shaft and the propeller shaft between the driving-wheel and the driven-wheel and having a substantially continuous and smooth contact-face extending about the axis of rotation of the gear frame, a bevel pinion rotatable on the gear frame in mesh with the driving-wheel and the driven-wheel, a friction-contact device adjustable to the smooth contact-face, and graduatedly-controllable means for graduatedly adjusting the friction-contact device with varying degrees of pressure to the smooth contact-face.

66. In transmission and controlling gearing, the combination with a rotatable driving-wheel, a rotatable driven wheel, and a gear frame rotatable between the driving-wheel and the driven wheel, of a pinion rotatably mounted in the gear frame in engagement with the driving-wheel and the driven wheel and having an annular friction-contact face adapted to withstand continued sliding connection with a retarding device, a retarding device adjustably mounted in the gear frame adjacent to the pinion to frictionally engage the friction-contact face thereof, the device having an annular bearing-face adapted to resist wear when in contact with the friction-contact face of the pinion, and controlling means movably mounted in the gear frame and forcibly controlling the adjustability of the retarding device on the friction-contact face.

67. In reversing transmission gearing, the combination of a rotatable driving-shaft, a rotatable driven shaft, and reversing transmission gearing for connecting the driven shaft with the driving-shaft, with a series of controlling means for the gearing enabling the driving-shaft to rotate the driven shaft in one direction, another series of controlling means for the gearing enabling the driving-shaft to rotate the driven shaft in the reverse direction, and a movably supported and controllable connecting device having two different eccentric devices, one of the eccentric devices having controlling connection with one of the series of controlling means, the other of the eccentric devices having controlling connection with the other of the series of controlling means.

68. In speed-changing transmission gearing, the combination of a rotatable driving-wheel, a rotatable driven-wheel, a gear frame rotatable intermediately of the driving-wheel and the driven wheel, and a pinion rotatable in the gear frame in engagement with the driving-wheel and the driven-wheel and adapted to be variably controlled to graduatedly retard rotation thereof, with controlling means having a wedge-like element adapted to variably and graduatedly act on the pinion to vary the rate of rotation thereof, and a device for graduatedly controlling the controlling means.

69. In reversing speed-changing transmission and controlling gearing, the combination of a rotatable driving-shaft, a rotatable driven-shaft, graduatedly-controllable drive gearing having connection with the driving-shaft and the driven-shaft and provided with a graduatedly-adjustable forward-motion controlling device to coöperate with the drive gearing for transmitting motion from the driving-shaft to the driven-shaft in forward direction and at gradually-variable or selected intermediate speed, the drive gearing being provided also with a graduatedly-adjustable reverse-motion controlling device to coöperate with the drive gearing for transmitting motion from the driving-shaft to the driven-shaft in reverse direction and at gradually-variable or selected intermediate speed, a primary controller, and two series of pressure graduating adjusting means controlled by the primary controller, one of the series having operative connection with the forward-motion controlling device, the other of the series having operative connection with the reverse-motion controlling device.

70. In reversing transmission and controlling gearing, the combination of a rotatable driving-shaft, a rotatable driven shaft, reversing transmission gearing for connecting the driven shaft with the driving-shaft, two series of controlling devices for the transmission gearing, each series of devices including a movably-supported arm having a wrist pin, and a unitary connecting and controlling device adjustably supported and having two guide grooves therein, one of the guide grooves receiving the wrist pin of one of the arms and being adapted for adjusting and holding the arm, the other of the grooves receiving the wrist pin of the remaining arm and being adapted for adjusting and holding the arm.

71. In reversing speed-changing transmission and controlling gearing, the combination of a rotatable driving-shaft, a rotatable driven-shaft, a driving-gear wheel secured to the driving-shaft, a driven-gear wheel secured to the driven-shaft, graduatedly-controllable motion-reversing and speed-changing transmission means in coöperation with the driving-gear wheel and the driven-gear wheel, forward-motion controlling means having pressure graduating connecting elements for enabling the transmission means to transmit motion from the driving-gear wheel to the driven-gear wheel at different speeds in forward direction, reverse-motion controlling means for enabling the transmission means to transmit motion from the driving-gear wheel to the driven-gear wheel in reverse direction, and pressure graduating connecting means for synchronously controlling the forward-motion and the reverse-motion controlling means graduatedly to graduatedly control the transmission means for selectively determining and effecting the speed of the driven shaft relatively to the driving shaft.

72. In speed-changing transmission gearing, the combination of a rotatable driving-gear wheel, a rotatable driven-gear wheel, a rotatable gear frame, a pinion rotatable on the gear frame and engaging the driving-gear wheel and the driven-gear wheel to be rotated by the driving-gear wheel and to rotate the driven-gear wheel, and graduated pressure controlled slip connection means for graduatedly controlling the rotation of the pinion to vary and selectively determine the rotary speed thereof, with means for graduatedly controlling the rotation of the gear frame to vary selectively and determine the rotary speed thereof.

73. In speed-changing transmission gearing, the combination of a toothed rotatable pinion having a smooth annular contact-face separate from its supporting axis adapted for continued sliding contact under pressure, a rotatable gear frame rotatably supporting the pinion and provided with an adjustably controlled retarding pressure graduated device adapted for continued frictional bearing on the contact-face, a toothed driving-wheel in engagement with the pinion, and a toothed driven wheel in engagement with the pinion.

74. In speed-changing transmission gearing, the combination of a bevel-toothed pinion having a journal on one side and an annular contact-face on its opposite side, a gear frame rotatably supported and rotatably supporting the journal of the pinion, a bevel-toothed driving-wheel in engagement with the pinion, a bevel-toothed driven-wheel in engagement with the pinion, and controlling means coöperating with the gear frame and having a frictional retarding device to slidingly engage the contact-face of the pinion and graduatedly control the rotary speed of the pinion.

75. A speed-changing reversing and controlling gearing including a gear case adapted to hold a lubricant, a driving-shaft and a driven-shaft journaled in the case, a driving-wheel in the case secured to the driving-shaft, a driven-wheel in the case secured to the driven-shaft, a gear frame in the case rotatable on the axis of rotation of the driving-shaft, a pinion rotatably supported by the gear frame in engagement with the driving-wheel and the driven-wheel to be driven by the driving-wheel, graduatedly-adjustable controlling means coöperating with the gear frame and the pinion and adapted to selectively change the rotary speed or to stop rotation of the pinion, graduatedly-adjustable controlling means coöperating with the gear case and the gear frame and adapted to selectively change the rotary speed or to stop rotation of the gear frame, and graduating connecting and controlling means having cam-like connection with both of the graduatedly-adjustable controlling means.

76. A speed-changing transmission gearing including a rotatable driving-wheel, a rotatable driven-wheel, a rotatable gear frame, a pinion rotatably supported by the gear frame in engagement with the driving-wheel and the driven-wheel to be driven by the driving-wheel, graduatedly-controllable speed-controlling means including coöperating frictional retarding devices having correlated contact-faces adapted to resist wear in relatively slipping contact under pressure, the speed-controlling means being adapted to coöperate with the gear frame to determine the rotary speed of the pinion, and adjusting means for the speed-controlling means graduatedly acting forcibly thereon.

77. In transmission and controlling gearing, the combination of a rotatable driving-wheel, a rotatable driven-wheel, a rotatable gear frame having a circumferential smooth contact-face adapted to withstand continued sliding connection with a retarding device under pressure, a pinion rotatable on the gear frame in engagement with the driving-wheel and the driven-wheel, graduating means adapted to coöperate adjustably with the gear frame to control the rotary speed of the pinion, a friction-contact retarding device adjustable to the contact-face of the gear frame and adapted to withstand continued contact therewith under pressure on rotation of the frame, and graduatedly-controllable means for graduatedly adjusting the retarding device with varying degrees of pressure to the smooth contact-face.

78. A reversing speed-changing transmission and controlling gearing including a driving-shaft, a driven-shaft, controllable drive gearing having connection with the driving-shaft and the driven-shaft and provided with forward-motion friction-contact controlling devices to coöperate with the drive gearing for transmitting motion from the driving-shaft and at gradually-variable speed in forward direction to the driven-shaft, the drive gearing being provided also with reverse-motion friction-contact controlling devices to coöperate with the drive gearing for transmitting motion from the driving-shaft and at gradually-variable speed in the reverse direction to the driven-shaft, a series of operative adjusting means for operating and gradually adjusting pressure on the forward-motion controlling devices, another series of operative adjusting means for operating and gradually adjusting pressure on the reverse motion controlling devices, and a movably-supported prime controller provided with means operatively connecting the two series of adjusting means with the prime controller and adapted to enable the controller to operate and adjust each of the series of means separately.

79. In speed-changing transmission gearing, the combination of a driving-shaft, a driven-shaft, controllable drive gearing having connection with the driving-shaft and the driven-shaft and provided with a plurality of friction-contact controlling devices for graduatedly coöperating with the drive gearing to transmit motion from the driving-shaft and at gradually-variable speed to the driven-shaft, operable adjusting means including a movable pressure-graduating device for gradually adjusting pressure on the controlling devices, a movably-supported prime controller, means including a cam-like element operatively connecting the adjusting means with the prime controller and adapted to enable the controller to gradually move the adjusting means under control and to hold the adjusting means in various adjusted positions.

80. In reversing speed-changing transmission gearing, the combination of a rotatable driving-shaft, a rotatable driven-shaft, reversing transmission gearing for connecting the driven-shaft with the driving-shaft, a series of graduating controlling means for the gearing enabling the driving-shaft to rotate the driven-shaft in one direction, another series of graduating controlling means for the gearing enabling the driving-shaft to rotate the driven-shaft in the reverse direction, and a movably-supported and graduatedly-controllable connecting apparatus, having two different eccentric devices, one of the eccentric devices having controlling connection with one of the series of controlling means and being adapted to forcibly adjust and hold the controlling means in adjusted position, the other of the eccentric devices having controlling connection with the other of the series of controlling means and being adapted to forcibly adjust and hold the controlling means in adjusted position.

81. A compound graduating speed-changing and controlling gearing including a driving-shaft, a driven-shaft, an intermediate-shaft, graduatedly-controllable variable-speed drive gearing having connection with the driving-shaft and the intermediate shaft and provided with forward-motion friction-contact controlling devices adapted for graduated coöperation with the drive gearing to transmit motion from the driving-shaft and at gradually-variable speed in forward direction to the intermediate-shaft, the drive gearing being provided also with reverse-motion friction-contact controlling devices adapted for graduated coöperation with the drive gearing for transmitting motion from the driving-shaft and at gradually-variable speed in the reverse direction to the intermediate-shaft, a primary controller movably supported and provided with graduating connecting means operated and controlled thereby for operatively connecting together and synchronously operating and adjusting the forward-motion and the reverse-motion controlling devices graduatedly and forcibly and holding them in adjusted position to gradually change the speed and direction of motion of the intermediate-shaft, clutch means for directly connecting the driven-shaft to the intermediate-shaft, auxiliary gearing for indirectly connecting the driven-shaft with the intermediate-shaft, and an auxiliary controller for synchronously controlling the clutch means and the auxiliary gearing and enabling the intermediate-shaft when in motion to gradually change the speed and direction of motion of the auxiliary gearing on operation of the graduating connecting means by the primary controller.

82. In reversing speed-changing transmission and controlling gearing, the combination of a general-service gearing having means for transmitting motion in either forward or reverse direction and gradually varying the speed of the transmitted motion, a non-reversing auxiliary gearing adapted for augmenting the power to be transmitted by the general-service gearing and to transmit the augmented power, and connecting and controlling means enabling the auxiliary gearing to coöperate with the general-service gearing and transmit the motion therefrom, the connecting and controlling means coöperating to enable the general-service gearing to operate and to control and gradually vary the speed of the auxiliary gearing and to rotate the auxiliary gearing in either one or the reverse direction.

83. Transmission and controlling gearing including a driving-shaft, a propeller-shaft, compound speed-changing and reversing gearing adapted to be gradually controlled and to enable the driving-shaft to rotate the propeller-shaft at various speeds, the compound speed-changing and reversing gearing having means adapted to enable the compound gearing operating at low speed relatively to the driving-shaft to rotate the propeller-shaft at relatively lower speed, two series of controlling devices for controlling direction of motion and action of the compound gearing, and a graduating primary controller provided with a graduating and position-holding device having operative and controlling connection with the two series of controlling devices.

84. Transmission and controlling gearing including a driving-shaft, a propeller-shaft, reversing speed-changing transmission gearing adapted to enable the driving-shaft to rotate the driven-shaft at gradually differing speeds in either one or the opposite direction, a movably supported primary controller, two series of controlling devices for the transmission gearing operatively connected with and graduatedly controlled by the primary controller, braking means to reduce and control speed of rotation of the propeller-shaft, and controlling means having governable correlation with the primary controller to control the braking means.

85. The combination with a motor-vehicle including a motor and a propeller-shaft, of reversing speed-changing transmission gearing adapted to gradually connect the motor operatively with the propeller-shaft, the transmission gearing being provided with two series of controlling devices, a movably supported primary controller, graduating means for connecting the two series of controlling devices operatively with the primary controller to enable the primary controller to gradually control the speed of the transmission gearing, and movable means having correlation with the primary controller to be controlled thereby to permit reduction of speed of the propeller-shaft and the motor-vehicle.

In testimony whereof, I affix my signature in presence of two witnesses.

ELLIS T. SILVIUS.

Witnesses:
J. H. GARDNER,
M. E. SPARROW.